United States Patent Office 2,803,646
Patented Aug. 20, 1957

2,803,646

PROCESS OF PRODUCING ETHER-ESTERS

John Barr Bell, Jr., Locust, N. J., and William Jennings Peppel, Austin, Tex., assignors to Jefferson Chemical Company, Inc., New York, N. Y., a corporation of Delaware No Drawing. Application October 23, 1953, Serial No. 388,043

8 Claims. (Cl. 260—484)

This invention relates to new chemical compounds, namely, ether-esters of (a) 2-hydroxyalkoxyacetic acid and (b) 2-hydroxyalkoxy alkyl-substituted acetic acid, and to the production of such compounds.

The new compounds have the following structural formula:

$$R-O-\underset{H}{\overset{R_1}{\underset{|}{C}}}-\underset{H}{\overset{R_1}{\underset{|}{C}}}-O-\underset{H}{\overset{R_1}{\underset{|}{C}}}-C\overset{O}{\underset{OR}{\diagdown}}$$

in which R is an alkyl radical preferably such radical containing from 1 to 20 carbon atoms or an aralkyl radical in which the alkyl portion of the aralkyl radical contains at least 3 and preferably from 3 to 20 carbon atoms and more particularly a phenyl alkyl radical in which the alkyl group contains at least 3 and preferably from 3 to 20 carbon atoms and $R_1$ is hydrogen or an alkyl radical containing 1 or 2 carbon atoms. R and $R_1$ throughout this specification are the radicals hereinabove mentioned for R and $R_1$ respectively. Examples of such compounds derivable from 2-p-dioxanone are:

Methyl (2-methoxyethoxy) acetate
Ethyl (2-ethoxyethoxy) acetate
Butyl (2-butoxyethoxy) acetate
Octyl (2-octyloxyethoxy) acetate
Nonyl (2-nonyloxyethoxy) acetate
Decyl (2-decyloxyethoxy) acetate
Dodecyl (2-dodecyloxyethoxy) acetate
2-ethylhexyl [2'-(2-ethylhexyloxy)ethoxy] acetate
3-phenylpropyl [2'-(3-phenylpropoxy)ethoxy]acetate Alkyl substituted 2-p-dioxanones yield homologous compounds such as butyl 2-(2'-butoxyisopropoxy) propionate from 3,5-dimethyl-2-p-dioxanone; butyl (2-butoxyisopropoxy) acetate from 5-methyl-2-p-dioxanone; and butyl (2-butoxy-1-ethylethoxy) acetate from 5-ethyl-2-p-dioxanone.

Surprisingly it has been found that 2-p-dioxanone compounds react with primary and secondary alcohols (such as isopropyl alcohol, secondary butyl alcohol, secondary octyl alcohol, etc.) having the formula ROH to form ether-esters of (a) 2-hydroxyalkoxy acetic acids and (b) 2-hydroxyalkoxy alkyl-substituted acetic acids. Thus 2-p-dioxanone reacts with methanol to produce methyl (2-methoxyethoxy) acetate, with ethanol to produce ethyl (2-ethoxyethoxy) acetate, with butyl alcohol or isobutyl alcohol to produce a butyl (2-butoxyethoxy) acetate, with octyl alcohol to produce octyl (2-octyloxyethoxy) acetate, with nonyl alcohol to produce nonyl 2-nonyloxyethoxy) acetate, with decyl alcohol to produce decyl (2-decyloxyethoxy) acetate, with dodecyl alcohol to produce dodecyl (2-dodecyloxyethoxy) acetate, with 2-ethylhexanol to produce 2-ethylhexyl [2'-(2-ethylhexyloxy) ethoxy] acetate, and with 3-phenylpropanol to produce 3-phenylpropyl [2'-(3-phenylpropoxy) ethoxy] acetate.

The reaction is indicated by the following equation:

$$\underset{R_1CH}{\overset{R_1CH}{\diagdown}}\overset{O}{\underset{C=O}{\diagup}}\overset{HCR_1}{\diagdown} + 2ROH \longrightarrow R-O-\underset{H}{\overset{R_1}{\underset{|}{C}}}-\underset{H}{\overset{R_1}{\underset{|}{C}}}-O-\underset{H}{\overset{R_1}{\underset{|}{C}}}-C\overset{O}{\underset{OR}{\diagdown}} + H_2O$$

The reaction with 2-p-dioxanone is indicated by the following equation:

$$\underset{H_2C}{\overset{H_2C}{\diagdown}}\overset{O}{\underset{C=O}{\diagup}}\overset{CH_2}{\diagdown} + 2ROH \longrightarrow ROCH_2CH_2OCH_2COOR + H_2O$$

The physical properties of the linear ether-esters of this invention will depend on the substituents R and $R_1$. All of the ether-esters are useful as plasticizers. Furthermore the ether-esters derived from long chain alcohols, for example octanol and higher, are useful as synthetic lubricants. The ether-esters of this invention may also find utility as additives to lubricants to modify the viscosity and other characteristics of the lubricants.

In carrying out the reaction the 2-p-dioxanone compound is mixed with the primary or secondary alcohol or mixture of such alcohols and the mixture heated to a temperature which will effect the removal of the water of reaction in the presence of a non-volatile, strongly acidic catalyst. An excess of alcohol over and above the amount required for reaction is employed, i. e., more than 2 mols of alcohol are employed per mol of 2-p-dioxanone compound. In the interests of economy the excess desirably is of the order of 20% to 50% of the amount of alcohol theoretically required for the reaction.

The reaction desirably is carried out at a temperature of 120°–250° C., at atmospheric pressure, preferably at a temperature of from 160° C. to the boiling point of the alcohol used. Subatmospheric or superatmospheric pressures may be employed with corresponding changes in the above noted temperature range. Thus operating at higher pressures the temperature may be correspondingly higher and at subatmospheric pressures the temperature may be correspondingly lower. Preferred operation is to carry out the reaction by refluxing the reaction mixture, passing the water of reaction along with the alcohols which distill off to a condenser, separating the water from the alcohol, removing the water from the system and returning the alcohol to the reaction mixture. Upon completion of the reaction the acidic catalyst is neutralized and the desired ether-ester distilled or otherwise recovered from the neutralized reaction mixture.

As the catalyst any non-volatile strongly acidic compound which catalyzes the reaction may be employed. Examples of such catalysts are p-toluene sulfonic acid, sulfuric acid, sodium acid sulfate, alkyl or aryl sulfonic acids, and phosphoric acid.

The following examples illustrate the invention, but are not to be regarded as limiting it in any way. In these examples all parts are by weight.

*Example 1.—Preparation of 2-ethylhexyl [2'-(2-ethylhexyloxy)ethoxy] acetate*

102 parts (one mol) of 2-p-dioxanone and 359 parts (2.76 mol) of 2-ethylhexanol are refluxed with 10 parts p-toluene sulfonic acid catalyst. The water of reaction and the alcohol distilling over are condensed, the condensate collected, stratified, the water removed as the lower layer and the alcohol returned to the reaction mixture. After 8 hours of refluxing the reaction mixture at about 190° C., an excess of calcium carbonate over and above the amount required to completely neutralize the p-toluene sulfonic acid is added to the reaction mixture and thereafter the neutralized reaction mixture distilled. A 51% yield of 2-ethylhexyl [2'-(2-ethylhexyloxy)-ethoxy] acetate is obtained. This compound has the following formula:

CH₃CH₂CH₂CH₂CH(C₂H₅)CH₂OCH₂CH₂OCH₂C—OCH₂CH(C₂H₅)CH₂CH₂CH₂CH₃
‖
O

It has a boiling range of 187–218° C. at 2.3 mm., equivalent to 380–420° C. at atmospheric pressure; a saponification number of 168; a pour point of −70° F.; a flash point (TOC) of 365° F.; a viscosity in centistokes at 210° F. of 1.94 and at 100° F. of 6.51; and a viscosity index of 88.5.

*Example II.—Preparation of decyl (2-decyloxyethoxy) acetate*

The reaction conditions are the same as in Example I, except that 436 parts of a decyl alcohol, i. e., a C₁₀ (Oxo) alcohol derived from propylene trimer, is substituted for the 2-ethylhexanol, and the reaction mixture is refluted at about 210° C. A 43% yield of decyl (2-decyloxyethoxy) acetate is obtained. This compound is suitable for use as a lubricant; it has the following physical properties: a boiling point above 170° C. at 1.6 mm., equivalent to 375° C. at atmospheric pressure; a saponification number of 137; a pour point of −65° F.; a flash point (TOC) of 418° F.; a viscosity in centistokes at 210° F. of 3.33 and at 100° F. of 14.68; and a viscosity index of 104.

*Example III.—Preparation of nonyl (2-nonyloxyethoxy) acetate*

The reaction conditions are the same as in Example I, except that 399 parts of a C₉ (Oxo) alcohol derived from diisobutylene is substituted for the 2-ethylhexanol, and the reaction mixture is refluxed at about 180° C. A yield in excess of 43% of nonyl (2-nonyloxyethoxy) acetate is obtained. It is suitable for use as a lubricant. It has the following physical properties: a boiling range of 178–200° C. at 0.4 mm., equivalent to 420–455° C., a saponification number of 155; a pour point of −75° F.; a flash point (TOC) of 395° F.; a viscosity in centistokes at 210° F. of 2.83 and at 100° F. of 10.59; and a viscosity index of 129.

*Example IV.—Preparation of butyl (2-butoxyethoxy) acetate*

The reaction conditions are the same as in Example I, except that 185 parts of n-butanol (2.5 mols) is substituted for the 2-ethylhexanol, and the reaction mixture is refluxed at about 125° C. for about 284 hours. A 53.5% yield of butyl (2-butoxyethoxy) acetate boiling at 242–275° C. at atmospheric pressure is obtained. By elevating the reaction temperature to say about 160° C., the reaction time can be materially shortened.

The substitution of other primary or secondary alcohols including branched chain alcohols and aralkyl alcohols in which the alkyl group contains at least 3 carbon atoms results in the formation of the corresponding ether-esters.

The expression 2-p-dioxanone compound (s) is used herein as a generic expression to include 2-p-dioxanone and substituted dioxanones having the structural formula

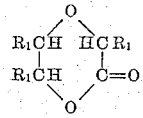

It is to be understood that this invention is not restricted to the present disclosure otherwise than as defined by the appended claims.

What is claimed is:
1. A process of producing an ether-ester having the formula

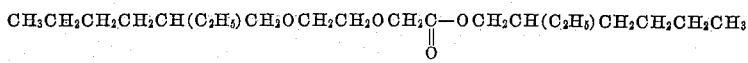

in which the two R groups are identical and from the group consisting of alkyl radicals containing from 1 to 20 carbon atoms and phenyl alkyl radicals the alkyl portions of which contain from 3 to 20 carbon atoms and in which R₁ is from the group consisting of hydrogen and alkyl radicals containing from 1 to 2 carbon atoms, which process comprises reacting at a temperature in excess of 120° C. a 2-p-dioxanone compound having the formula

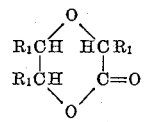

in which R₁ has the value above given with an alcohol selected from the group consisting of primary and secondary alcohols having the formula ROH in which R has the value above given in the presence of a non-volatile, strongly acidic catalyst while removing the water of reaction as produced.

2. A process according to claim 1, in which said catalyst is p-toluene sulfonic acid.

3. A process according to claim 1, in which said catalyst is sulfuric acid.

4. A process of producing etherified ether-esters which comprises reacting a compound from the group consisting of 2-p-dioxanone and alkyl-substituted 2-p-dioxanones the alkyl substituents of which contain from 1 to 2 carbon atoms with an alcohol selected from the group consisting of primary and secondary alcohols having the formula ROH in which R is from the group consisting of alkyl radicals containing from 1 to 20 carbon atoms and phenylalkyl radicals the alkyl portions of which contain from 3 to 20 carbon atoms in the presence of a non-volatile strongly acidic catalyst and at a temperature in excess of 120° C., the amount of alcohol present in the reaction mixture being in excess of that theoretically required for the reaction, heating the reaction mixture to drive off a mixture of alcohol and water of reaction, separating the water from this mixture, and returning the alcohol to the reaction mixture.

5. The process of producing 2-ethylhexyl [2'-(2-ethylhexyloxy)ethoxy] acetate, which comprises refluxing at a temperature in excess of 120° C. a reaction mixture of 2-p-dioxanone, 2-ethylhexanol, and a non-volatile, strongly acidic catalyst, the amount of 2-ethylhexanol being in excess of that theoretically required for the reaction, removing a mixture of alcohol and water of reaction, separating the water from this mixture, returning the alcohol to the reaction mixture and distilling off from the reaction mixture 2-ethylhexyl [2'-(2-ethylhexyloxy)-ethoxy] acetate.

6. The process of producing decyl (2-decyloxyethoxy) acetate, which comprises refluxing at a temperature in excess of 120° C. a reaction mixture of 2-p-dioxanone, decyl alcohol and a non-volatile, strongly acidic catalyst, the amount of alcohol being in excess of that theoretically required for the reaction, separating from the reaction mixture water of reaction and unreacted alcohol, and recovering the decyl (2-decyloxyethoxy) acetate from the reaction mixture.

7. The process of producing nonyl (2-nonyloxyethoxy)

acetate, which comprises heating a reaction mixture of 2-p-dioxanone, nonyl alcohol and a non-volatile, strongly acidic catalyst at a temperature within the range of 160° C. to 250° C., separating from the reaction mixture the water of reaction and the alcohol and recovering the nonyl (2-nonyloxyethoxy) acetate from the reaction mixture.

8. The process of producing butyl (2-butoxyethoxy) acetate, which comprises heating a mixture of 2-p-dioxanone, n-butanol and a non-volatile, strongly acidic catalyst at a temperature within the range of 120° to 250° C., the amount of n-butanol being in excess of that theoretically required for the reaction, separating from the reaction mixture the water of reaction and the excess butanol and recovering butyl (2-butoxyethoxy) acetate from the reaction mixture.

References Cited in the file of this patent

UNITED STATES PATENTS

| | | |
|---|---|---|
| 2,010,154 | Hubacher | Aug. 6, 1935 |
| 2,027,991 | Lubbert et al. | Jan. 14, 1936 |
| 2,109,947 | North | Mar. 1, 1938 |
| 2,364,438 | Gresham | Dec. 5, 1944 |